United States Patent
Shirasaka et al.

(10) Patent No.: US 8,097,369 B2
(45) Date of Patent: Jan. 17, 2012

(54) CONTROL APPARATUS FOR FUEL CELL VEHICLE AND CONTROL METHOD FOR FUEL CELL VEHICLE

(75) Inventors: Takuya Shirasaka, Shioya-gun (JP); Satoshi Aoyagi, Shimotsuke (JP); Asao Uenodai, Rancho Palos Verdes, CA (US); Hibiki Saeki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1231 days.

(21) Appl. No.: 11/447,458

(22) Filed: Jun. 6, 2006

(65) Prior Publication Data

US 2006/0278450 A1 Dec. 14, 2006

(30) Foreign Application Priority Data

Jun. 9, 2005 (JP) ................................. 2005-169541

(51) Int. Cl.
*H01M 8/00* (2006.01)
(52) U.S. Cl. ........ 429/400; 429/428; 429/430; 429/431; 429/432
(58) Field of Classification Search .................... 429/34, 429/400, 428, 430, 431, 432
See application file for complete search history.

(56) References Cited

U.S. PATENT DOCUMENTS

2002/0192519 A1 12/2002 Fujita et al.
2004/0065489 A1 4/2004 Aberle et al.

FOREIGN PATENT DOCUMENTS

| EP | 1207578 A2 | 5/2002 |
|---|---|---|
| EP | 1445144 A1 | 8/2004 |
| JP | 9-9419 | 1/1997 |
| JP | 10-074533 | 3/1998 |
| JP | 2003-079007 | 3/2003 |
| JP | 2003-86211 | 3/2003 |
| JP | 2003-274508 | 9/2003 |
| JP | 2004-185820 | 7/2004 |
| JP | 2004-328840 | 11/2004 |

OTHER PUBLICATIONS

Japanese Office Action for Application No. 2005-169541, dated Feb. 26, 2008.
European Search Report for Application No. 06011649.8-2207, dated Aug. 25, 2006.

*Primary Examiner* — Jane Rhee
(74) *Attorney, Agent, or Firm* — Nelson Mullins Riley & Scarborough LLP; Anthony A. Laurentano (57) ABSTRACT

A management ECU of a control unit predicts the reduction degree of a system voltage according to an operational state of a motor based on the temperature of a fuel cell and a number of rotations of the motor, sets motor output restriction start voltage and motor output restriction end voltage which are threshold values of the system voltage for triggering an execution start and an execution end of a processing to restrict an output of the motor, and outputs them to a motor ECU. The motor ECU sets an output restriction coefficient that is a restriction rate in restricting the output of the motor based on a detected value of the system voltage and the motor output restriction start voltage and the motor output restriction end voltage, and restricts the output of the motor.

14 Claims, 9 Drawing Sheets

CONTROL APPARATUS FOR FUEL CELL VEHICLE AND CONTROL METHOD FOR FUEL CELL VEHICLE

BACKGROUND OF THE INVENTION

1. Field of the Invention

The present invention relates to a control apparatus for a fuel cell vehicle and to a control method for a fuel cell vehicle.

Priority is claimed on Japanese Patent Application No. 2005-169541, filed Jun. 9, 2005, the contents of which are incorporated herein by reference.

2. Description of the Related Art

Conventionally, in a fuel cell system in which, for example, fuel cells and secondary batteries connected in parallel serve as a power source relative to loads such as a motor for vehicle travel, a fuel cell system which restricts power supply to the load according to a residual capacity of the secondary batteries is already known (for example, see patent document 1).

Additionally, in a control apparatus for a fuel cell vehicle where, for example, fuel cells and secondary batteries connected in parallel serve as a power source relative to loads such as a motor for vehicle travel, a control apparatus for a fuel cell vehicle which restricts power supply to the load according to the maximum power generation volume of the fuel cells and a residual capacity of the secondary batteries, and which controls the regenerative operation of the motor for vehicle travel is already known (for example, see patent document 2).

Additionally, in a control apparatus for a fuel cell vehicle where, for example, fuel cells and secondary batteries connected in parallel serve as a power source relative to a load such as a motor for vehicle travel, a control apparatus for a fuel cell vehicle which restricts a power supply to the load according to the output voltage of the fuel cells and a maximum voltage of the secondary batteries is already known (for example, see patent document 3).

Patent document 1: Japanese Unexamined Patent Application, First Publication No. Hi0-74533.

Patent document 2: Japanese Unexamined Patent Application, First Publication No. 2003-79007.

Patent document 3: Japanese Unexamined Patent Application, First Publication No. 2004-185820.

With the fuel cell system and control apparatus relating to conventional technology mentioned above, the power supply to a motor used to operate a vehicle is controlled corresponding to the power which can be output from a power source formed by a fuel cell and a secondary battery. Therefore, for example, by establishing the upper limit of power which can be output from a power source corresponding to the temperature of the fuel cell or the secondary battery, the actual power consumed by the motor used to operate the vehicle is detected, corresponding to a detected value of an appropriate ammeter and voltage meter, and if it is detected that the actual power exceeds the upper power limit, then the power supply to the motor operating the vehicle is restricted.

However, when tires slip on a road surface which has a relatively low frictional resistance due to rainfall, freezing or the like, there is a case in which the output of the vehicle suddenly increases. In this case, the upper power limit is generated from the power source while detecting the actual current power consumed by the motor and restriction of the supply of the electronic power to the motor for driving the vehicle is started. Therefore, the system voltage of the fuel cell system is lowered excessively and the fuel cell and the secondary battery are not appropriately protected.

Concerning such problems, if, for example, as a determination threshold value relating to the actual electric power of a motor used to operate a vehicle, a value is established which is lower by a specific value than the upper power limit which can be output from the power source, even at a time prior to reaching the actual electric power of the motor used to drive a vehicle, at the point in time when the actual electric power reaches the specified determined threshold value, the restriction of the power supply to the motor used to drive the vehicle commences. In this case, there is the problem of excessively restricting the motor output used to drive the vehicle.

The present invention considers these circumstances, and has the objective of providing a control apparatus for a fuel cell vehicle and a control method for a fuel cell vehicle which can prevent excessively restricting the motor output used to drive a vehicle, as well as the excessive reduction of the system voltage of the fuel cell system.

SUMMARY OF THE INVENTION

In order to solve the aforementioned problems, a control apparatus for a fuel cell vehicle of the present invention has: a motor which drives a vehicle; a motor control device which controls driving and regenerative operation of the motor; a fuel cell which serves as a fuel cell system constituting a power source for the motor, which generates power by an electrochemical reaction using reaction gas supplied from a reaction gas supply device; an accumulator which is charged by power generation of the fuel cell; an output control device which controls an output of the fuel cell; a voltage reduction degree prediction device which predicts a reduction degree of the system voltage of the fuel cell system corresponding to an operational state of the motor; and a motor output restriction device which restricts a motor output corresponding to the reduction degree of the system voltage predicted by the voltage reduction degree prediction device.

According to the aforementioned control apparatus for a fuel cell vehicle, relative to the system voltage of the fuel cell system in which the fuel cell and the accumulator connected in parallel are the power source for the motor, the reduction degree of the system voltage (e.g., a quantity of state of an amount of reduction of the system voltage including time changes and the like of the amount of reduction of the system voltage in addition to the amount of reduction of the system voltage itself) corresponding to the operational state of the motor is predicted. The output (e.g., consumed voltage) of the motor is restricted corresponding to the prediction results, for example, in a state in which the number of rotations of the motor is relatively low and the generatable torque is increased. In such a condition, if the vehicle runs on a road surface which has a relatively low frictional resistance due to rainfall, freezing or the like, it is possible to increase the motor output suddenly with an increase of the number of rotations of the motor. Hence, if there is a predicted possibility of a sudden increase in the motor output, the possibility that the system voltage accompanying the increase of consumed power by the motor will suddenly drop is determined, and a determination threshold value for determining whether or not to execute a restriction on the motor output will be set to a value at which the output restriction can be easily accomplished. On the other hand, if it is predicted that the sudden increase in the motor output will be suppressed, then the determination threshold value for determining whether or not to restrict the motor output will be set to a value which makes output restriction difficult to execute.

As a result, if in actuality, the motor output suddenly increases, excessive reduction of the system voltage of the fuel cell system can be prevented, and in a state in which the possibility of excessive reduction of the system voltage is low, excessive restriction of the motor output can be prevented.

According to the control apparatus for a fuel cell vehicle of the present invention, even if there is a sudden increase in the motor output, excessive reduction of the system voltage of the fuel cell system can be prevented, along with the excessive restriction of the motor output.

The aforementioned control apparatus for a fuel cell vehicle may further have a tachometer which detects a number of rotations of the motor, and the voltage reduction degree prediction device predicts a maximum value of an amount of change in the motor output based on the number of rotations detected by the tachometer.

According to the aforementioned control apparatus for a fuel cell vehicle, there is an established specific corresponding relationship between the number of rotations of the motor and the generatable torque, corresponding to the properties of the motor, and in a relatively low number of rotations region, the generatable torque is increased, and in a relatively high number of rotations region, the generatable torque is reduced. Hence, by estimating the maximum value of the amount of change of the motor output based on the number of rotations of the motor, the reduction degree of the system voltage of the fuel cell system which varies corresponding to the operational state of the motor can be predicted with high precision. By setting a determination threshold value for determining whether or not to execute the output restriction of the motor corresponding to the predicted results, even if the motor output suddenly increases, excessive reduction of the system voltage of the fuel cell system can be prevented, along with preventing excess restriction of the motor output.

According to the aforementioned control apparatus for a fuel cell vehicle of the present invention, by estimating the maximum value of the amount of change of the motor output based on the number of motor rotations, the fuel cell system reduction degree of the system voltage which changes corresponding to the operational state of the motor can be precisely predicted.

The aforementioned control apparatus for a fuel cell vehicle may have a thermometer which detects the temperature of the fuel cell. Thereby the voltage reduction degree prediction device predicts a maximum value of an amount of reduction of the system voltage corresponding to an operational state of the motor based on the temperature detected by the thermometer.

According to the aforementioned control apparatus for a fuel cell vehicle, the upper power limit which can be output from the fuel cell changes corresponding to the temperature of the fuel cell, and at a relatively low temperature, the upper power limit drops, and at a relatively high temperature, the upper power limit increases. Hence, the maximum value of the amount of reduction of the system voltage of the fuel cell system which changes corresponding to the operational state of the motor can be predicted based on the temperature of the fuel cell. By setting the determination threshold value for determining whether or not to restrict the motor output corresponding to the prediction results, even if the motor output suddenly increases, excessive reduction of the system voltage of the fuel cell system can be prevented, along with excessive restriction of the motor output.

According to the aforementioned control apparatus for a fuel cell vehicle of the present invention, the reduction degree of the system voltage of the fuel cell system, which changes corresponding to the operational state of the motor, can be precisely predicted based on the upper power limit which can be output from the fuel cell.

The aforementioned control apparatus for a fuel cell vehicle may have a tachometer which detects a number of rotations of the motor, and a thermometer which detects the temperature of the fuel cell, thereby the voltage reduction degree prediction device predicts that an amount of reduction of the system voltage changes with an increasing tendency corresponding to an operational state of the motor, in accompaniment with a reduction of the temperature detected by the thermometer and reduction of the number of rotations detected by the tachometer.

According to the aforementioned control apparatus for a fuel cell vehicle, the upper power limit which can be output from the fuel cell changes toward a reducing tendency, along with a reduction in the temperature of the fuel cell, and a changeable amount of the motor output changes toward an increasing tendency with a reduction of the number of rotations of the motor. Therefore, by dropping the number of rotations of the motor along with dropping the temperature of the fuel cell, the amount of reduction of the system voltage can be predicted with changes toward an increasing tendency. By setting the determination threshold value to determine whether or not to execute restriction of the motor output corresponding to the predicted results, even if the motor output suddenly increases, excessive reduction of the system voltage of the fuel cell system can be prevented, along with the excessive restriction of motor output.

According to the aforementioned control apparatus for a fuel cell vehicle, the reduction degree of the system voltage of the fuel cell system which changes corresponding to the operational state of the motor can be precisely predicted based on the upper power limit which can be output from the fuel cell which changes corresponding to the temperature of the fuel cell, and the amount of change of the motor output which changes corresponding to the number of rotations of the motor.

In the aforementioned control apparatus for a fuel cell vehicle of the present invention, preferably the motor output restriction device restricts the motor output when the system voltage is less than a first threshold value, and in accompaniment with an increase of the reduction degree of the system voltage predicted by the voltage reduction degree prediction device, the first threshold is changed toward an increasing tendency.

According to the aforementioned control apparatus for a fuel cell vehicle, if the system voltage is equal to or greater than the first threshold value, restriction of motor output is prohibited, and if the system voltage is reduced exceeding the first threshold value, the motor output is restricted. Therefore, the motor output is easily accomplished by increasing the first threshold value. Hence, if the reduction degree of the system voltage is predicted to be increasing, by changing the first threshold value toward an increasing tendency, the motor output can be restricted prior to the system voltage becoming excessively reduced.

According to the aforementioned control apparatus for a fuel cell vehicle, if the reduction degree of the system voltage is predicted to increase, by changing the first threshold value toward an increase, the motor output can be restricted prior to the system voltage becoming excessively reduced.

In the aforementioned control apparatus for a fuel cell vehicle of the present invention, it is preferable that the motor output restriction device be set to the second threshold value which is less than the first threshold value, and if the system voltage is less than the first threshold value or greater than the second threshold value, the restriction ratio when restricting the motor output be set corresponding to the system voltage.

According to the aforementioned control apparatus for a fuel cell vehicle, in accompaniment with a reduction of the system voltage from the first threshold value to the second threshold value, by setting the restriction ratio to change toward an increase, excessive restriction of the motor output can be prevented.

According to the aforementioned control apparatus for a fuel cell vehicle, accompanying, for example, the reduction in the system voltage from the first threshold value to the second threshold value, by setting the restriction ratio to change toward an increase, excessive restriction of the motor output can be prevented.

The aforementioned control apparatus for a fuel cell vehicle of the present invention may further have a first computation unit having the voltage reduction degree prediction device and a second computation unit having the motor output restriction device.

The aforementioned control apparatus for a fuel cell vehicle has a first computation unit which predicts the reduction degree of the system voltage of the fuel cell system, and a second computation unit which restricts the motor output corresponding to the reduction degree of the system voltage. Thereby, for example, in comparison with a case in which prediction processing and restriction processing are executed by a single computation unit, namely, in comparison with a case in which a single computation unit executes a series of processes for detecting the change in the motor output, estimating the reduction degree of the system voltage based on the detection results, and restricting the motor output corresponding to the prediction results, restriction of the motor output can be immediately executed.

Processing for estimating the reduction degree of the system voltage requires a relatively complex calculation processing to improve prediction precision. Therefore, the prediction processing can be shortened in the time required for executing by executing independently of the restriction processing which restricts motor output corresponding to the detection results of changes in motor output, and by inputting the prediction results from the first computation unit to the second computation unit at an appropriate timing. Thereby, even if there is a sudden increase in the motor output, excessive reduction in the system voltage of the fuel cell system owing to a delay of starting the restriction of motor output can be prevented.

According to the aforementioned control apparatus for a fuel cell vehicle, the time required for restriction processing which restricts the motor output corresponding to the detection results of the change in the motor output can be shortened.

The aforementioned control apparatus for a fuel cell vehicle of the present invention may further have a power conversion device capable of increasing the terminal voltage of the accumulator. In this case, the voltage reduction degree prediction device predicts the amount of reduction of the system voltage corresponding to the operational state of the motor based on the operating state of the voltage boosting operation by the voltage conversion device.

According to the aforementioned control apparatus for a fuel cell vehicle, reduction of the system voltage of the fuel cell system can be suppressed by boosting the terminal voltage of the accumulator by the power conversion device. Hence, excessive restriction of the motor output can be prevented when restricting the motor output corresponding to the prediction results by estimating the amount of reduction of the system voltage corresponding to the operational state of the motor based on the operating state (for example, the voltage which can be raised and the like) of the voltage boosting operation accomplished by the power conversion device.

According to the aforementioned control apparatus for a fuel cell vehicle, by boosting the terminal voltage of the accumulator by the voltage boosting operation of the power conversion device, the reduction of the system voltage of the fuel cell system can be suppressed. Therefore, excessive restriction of the motor output can be prevented when restricting the motor output corresponding to the prediction results of the amount of reduction of the system voltage.

A control method for a fuel cell vehicle of the present invention is a method of controlling the fuel cell vehicle which has: a motor which drives a vehicle; a motor control device which controls driving and regenerative operation of the motor; a fuel cell which generates electronic power by electrochemical reaction with reactive gas supplied from a reaction gas supply device as a fuel cell system constituting a power source for the motor; an accumulator which is charged by the generated power of the fuel cell and the regenerative power of the motor; and an output control device which controls the fuel cell output, and which predicts a reduction degree of the system voltage of the fuel cell system corresponding to an operational state of the motor, and which controls an output of the motor corresponding to the reduction degree.

According to the aforementioned control method for a fuel cell vehicle, relative to the system voltage of the fuel cell system in which the fuel cell and the accumulator connected in parallel are the power source for the motor, the reduction degree of the system voltage (e.g., a quantity of state of an amount of reduction of the system voltage including time changes and the like of the amount of reduction of the system voltage in addition to the amount of reduction of the system voltage itself) corresponding to the operational state of the motor is predicted. The output (e.g., consumed voltage) of the motor is restricted corresponding to the prediction results, for example, in a state in which the number of rotations of the motor is relatively low and the generatable torque is increased. In such a condition, if the vehicle runs on a road surface which has a relatively low frictional resistance due to rainfall, freezing or the like, it is possible to increase the motor output suddenly with an increase of the number of rotations of the motor. Hence, if there is predicted possibility of a sudden increase in the motor output, the possibility that the system voltage accompanying the increase of consumed power by the motor will suddenly drop is a determined, and a determination threshold value for determining whether or not to execute a restriction on the motor output will be set to a value at which the output restriction can be easily accomplished. On the other hand, if it is predicted that the sudden increase in the motor output will be suppressed, then the determination threshold value for determining whether or not to restrict the motor output will be set to a value which makes output restriction difficult to execute.

According to the control method for a fuel cell vehicle of the present invention, even if there is a sudden increase in the motor output, excessive reduction of the system voltage of the fuel cell system can be prevented. In addition, the excessive restriction of the motor output is prevented in a condition in which there is less possibility of the system voltage excessively reducing.

According to the aforementioned control method for a fuel cell vehicle, even if there is a sudden increase in the motor output, excessive reduction of the system voltage of the fuel cell system can be prevented, along with preventing the excessive restriction of the motor output.

In the aforementioned control method for a fuel cell vehicle, it is preferable that a maximum value of a variation amount of the motor output is preferably predicted based on the number of rotations of the motor.

According to the aforementioned control method for a fuel cell vehicle, there is an established specific corresponding relationship between the number of rotations of the motor and the generatable torque, corresponding to the properties of the motor, and in a relatively low number of rotations region, the generatable torque is increased, and in a relatively high number of rotations region, the generatable torque is reduced. Hence, by estimating the maximum value of the amount of change of the motor output based on the number of rotations of the motor, the reduction degree of the system voltage of the fuel cell system which varies corresponding to the operational state of the motor can be predicted with high precision. By setting a determination threshold value for determining whether or not to execute the output restriction of the motor corresponding to the predicted results, even if the motor output suddenly increases, excessive reduction of the system voltage of the fuel cell system can be prevented, along with preventing excess restriction of the motor output.

According to the aforementioned control method for a fuel cell vehicle, by estimating the maximum value of the amount of change of the motor output based on the number of motor rotations, the fuel cell system reduction degree of the system voltage which changes corresponding to the operational state of the motor can be precisely predicted.

In the control method for a fuel cell vehicle, it is preferable to predict the maximum value of the reduction amount of the system voltage corresponding to the operational state of the motor based on the temperature of the fuel cell.

According to the aforementioned control method for a fuel cell vehicle, the upper power limit which can be output from the fuel cell changes corresponding to the temperature of the fuel cell, and at a relatively low temperature, the upper power limit drops, and at a relatively high temperature, the upper power limit increases. Hence, the maximum value of the amount of reduction of the system voltage of the fuel cell system which changes corresponding to the operational state of the motor can be predicted based on the temperature of the fuel cell. By setting the determination threshold value for determining whether or not to restrict the motor output corresponding to the prediction results, even if the motor output suddenly increases, excessive reduction of the system voltage of the fuel cell system can be prevented, along with preventing the excessive restriction of the motor output.

According to the aforementioned control method for a fuel cell vehicle of the present invention, the reduction degree of the system voltage of the fuel cell system, which changes corresponding to the operational state of the motor, can be precisely predicted based on the upper power limit which can be output from the fuel cell.

In the control method for a fuel cell vehicle of the present invention, it is preferable that the amount of reduction of the system voltage be predicted to change toward an increasing tendency corresponding to the operational state of the motor, in accompaniment with a reduction in the temperature of the fuel cell, and the reduction of the number of rotations of the motor.

According to the aforementioned control method for a fuel cell vehicle, the upper power limit which can be output from the fuel cell changes toward a reducing tendency, along with a reduction in the temperature of the fuel cell, and a changeable amount of the motor output changes toward an increasing tendency with a reduction of the number of rotations of the motor. Therefore, by dropping the number of rotations of the motor along with dropping the temperature of the fuel cell, the amount of reduction of the system voltage can be predicted with changes toward an increasing tendency. By setting the determination threshold value to determine whether or not to execute restriction of the motor output corresponding to the predicted results, even if the motor output suddenly increases, excessive reduction of the system voltage of the fuel cell system can be prevented, along with preventing the excessive restriction of motor output.

According to the control method for a fuel cell vehicle, the reduction degree of the system voltage of fuel cell system which changes corresponding to the operational state of the motor can be precisely predicted based on the upper power limit which can be output from the fuel cell which changes corresponding to the temperature of the fuel cell, and the amount of change of the motor output which changes corresponding to the number of rotations of the motor.

In the aforementioned control method for a fuel cell vehicle of the present invention, it is preferable that, if the system voltage is less than the first threshold value, the motor output be restricted, and the first threshold value be changed toward an increasing tendency along with an increase in the reduction degree.

According to the aforementioned control method for a fuel cell vehicle, if the system voltage is equal to or greater than the first threshold value, restriction of motor output is prohibited, and if the system voltage is reduced exceeding the first threshold value, the motor output is restricted. Therefore, restriction of the motor output is easily accomplished by increasing the first threshold value. Hence, if the reduction degree of the system voltage is predicted to be increasing, by changing the first threshold value toward an increasing tendency, the motor output can be restricted prior to the system voltage becoming excessively reduced.

According to the aforementioned control method for a fuel cell vehicle, if the reduction degree of the system voltage is predicted to increase, by changing the first threshold value toward an increase, the motor output can be restricted prior to the system voltage becoming excessively reduced.

In the aforementioned control method for a fuel cell vehicle, it is preferable that the motor output restriction device be set to the second threshold value which is less than the first threshold value, and if the system voltage is less than the first threshold value or greater than the second threshold value, the restriction ratio when restricting the motor output be set corresponding to the system voltage.

According to the aforementioned control method for a fuel cell vehicle, in accompaniment with a reduction of the system voltage from the first threshold value to the second threshold value, by setting the restriction ratio to change toward an increase, excessive restriction of the motor output can be prevented.

According to the aforementioned control method for a fuel cell vehicle, accompanying, for example, the reduction in the system voltage from the first threshold value to the second threshold value, by setting the restriction ratio to change toward an increase, excessive restriction of the motor output can be prevented.

In the aforementioned control method for a fuel cell vehicle, it is preferable that prediction processing of the reduction degree of the system voltage of the fuel cell system corresponding to the operational state of the motor and restriction processing of the motor output corresponding to the reduction degree be executed at mutually independent timing.

According to the control method for a fuel cell vehicle, in comparison with a case in which prediction processing which predicts the reduction degree of the system voltage and restriction processing which restricts the motor output are executed in a series of timings, namely, in comparison with a case in which detecting the change in the motor output, estimating the reduction degree of the system voltage based on the detection results, and restricting the motor output corresponding to the prediction results, restriction of the motor output can be immediately executed.

Prediction processing for estimating the reduction degree of the system voltage requires relatively complex computer processing in order to improve prediction precision. Therefore, by executing the prediction processing at a timing which is independent of that of restriction processing which executes the motor output restriction corresponding to the detection results of the output changes of the motor, and by storing the prediction results in an appropriate storage apparatus, the time required to execute the restriction processing can be shortened. As a result, even if the motor output suddenly increases, excessive reduction of the system voltage of the fuel cell system can be prevented.

According to the aforementioned control method for a fuel cell vehicle, the time required for restriction processing which restricts the motor output corresponding to the detection results of the change in the motor output can be shortened.

In the aforementioned control method for a fuel cell vehicle, the amount of reduction of the system voltage which corresponds to the operational state of the motor may be predicted, based on the operational state of the boosting voltage operation accomplished by a power conversion device which can boost the voltage of the terminal voltage of the accumulator.

According to the aforementioned control method for a fuel cell vehicle, reduction of the system voltage of the fuel cell system can be suppressed by boosting the terminal voltage of the accumulator by the power conversion device. Hence, excessive restriction of the motor output can be prevented when restricting the motor output corresponding to the prediction results by estimating the amount of reduction of the system voltage corresponding to the operational state of the motor based on the operating state of the voltage boosting operation accomplished by the power conversion device.

According to the aforementioned control method for a fuel cell vehicle, by boosting the terminal voltage of the accumulator by the voltage boosting operation of the power conversion device, the reduction of the system voltage of the fuel cell system can be suppressed. Therefore, excessive restriction of the motor output can be prevented when restricting the motor output corresponding to the prediction results of the amount of reduction of the system voltage.

DESCRIPTION OF THE PREFERED EMBODIMENTS

An embodiment of the control apparatus for a fuel cell vehicle of the present invention is described hereafter with reference to the drawings.

Figure 1:
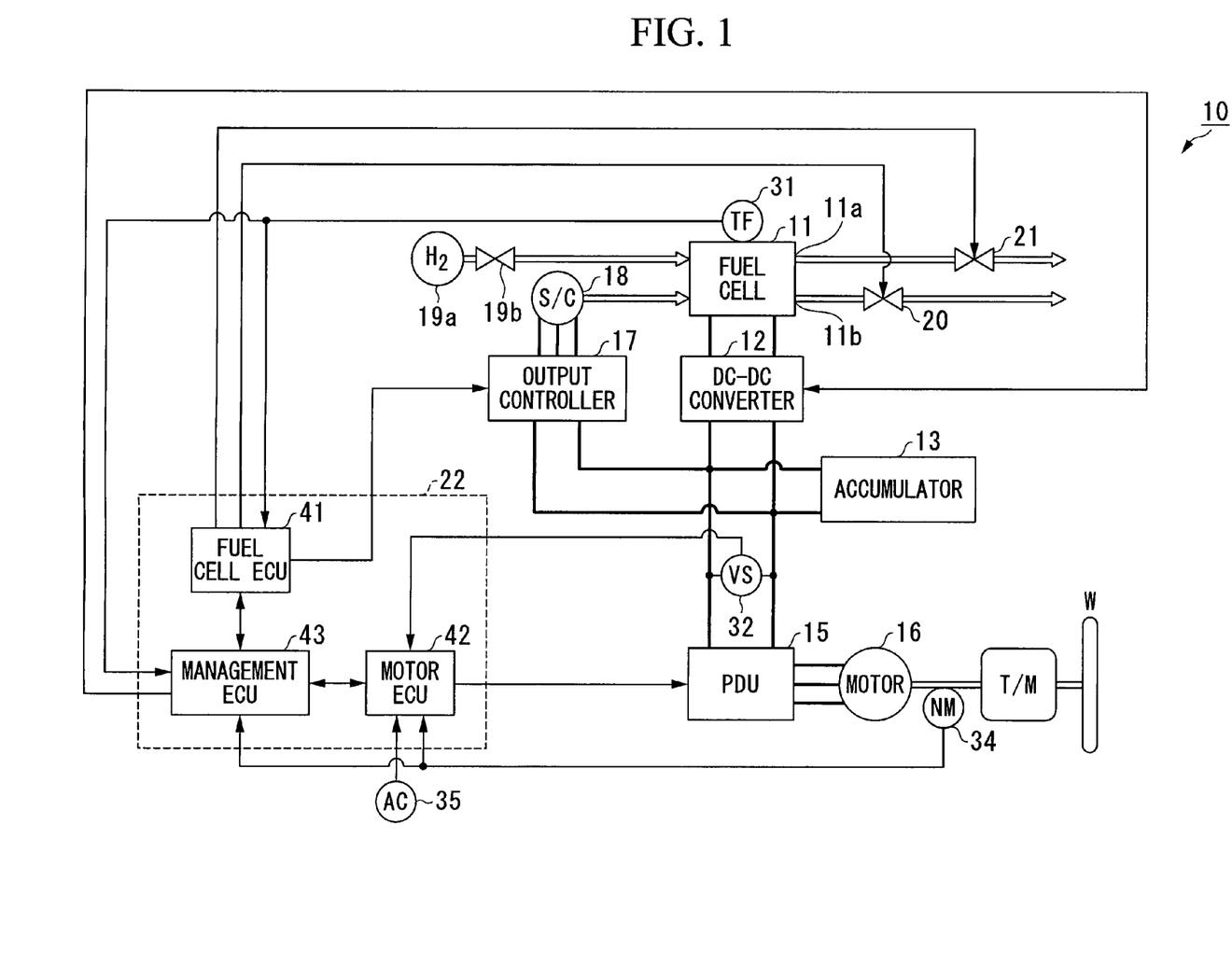
FIG. 1 is a drawing showing a construction of a control apparatus for a fuel cell vehicle according to an embodiment of the present invention.

A control apparatus for a fuel cell vehicle 10 of the present embodiment has, for example as shown in FIG. 1, a fuel cell 11, a DC-DC converter 12, an accumulator 13, a PDU (power drive unit) 15, a motor 16, an output controller (output control device) 17, an air supply unit (reactive gas supply device) (S/C) 18, a hydrogen tank (reactive gas supply device) 19a and a hydrogen supply valve (reactive gas supply device) 19b, a back-pressure regulating valve 20, a purging valve 21, a control unit 22, a fuel cell thermometer 31, a system voltage sensor 32, a motor tachometer 34, and an accelerator opening rate sensor 35.

The control unit 22 has, for example, a fuel cell ECU 41, a motor ECU 42, and a management ECU 43.

The fuel cell 11 is constituted by laminating a plurality of fuel cells. The fuel cell is constituted of an electrolyte electrode structure and a pair of separators which hold the electrolyte electrode structure therebetween. The electrolyte electrode structure is provided with a fuel electrode (anode) which includes an anode catalyst and a gas diffusion layer, an oxygen electrode (cathode) which includes a cathode catalyst and a gas diffusion layer, and a solid polymer electrolyte film including a cation-exchange film and the like. The solid polymer electrolyte film is held between the fuel electrode and the oxygen electrode. The laminated fuel cell is sandwiched between a pair of end plates on both ends in a direction of lamination.

The cathode of the fuel cell 11 is supplied with air which is an oxygen-containing oxidant gas (reactive gas) from the air supply unit 18 which includes an air compressor and the like. The anode is supplied with a fuel gas which includes hydrogen (reactive gas) from the high pressure hydrogen tank 19a via the hydrogen supply valve 19b.

Hydrogen which is ionized through a catalysis reaction on the anode catalyst of the anode moves to the cathode through the properly humidified solid polymer electrolyte films. Electrons generated during this movement are removed to the external circuit for use as direct current energy. At the same time, hydrogen ions, electrons, and oxygen are reacted, and water is generated at the cathode.

The hydrogen supply valve 19b is, for example, an air proportional pressure control valve. The hydrogen supply valve 19b is set so that hydrogen passed through the hydrogen supply valve 19b has a pressure at an exit of the hydrogen supply valve 19b within a prescribed range corresponding to a signal pressure which is a pressure of air supplied from the air supply unit 18.

The air supply unit 18 including an air compressor or the like absorbs air, for example, from the outside of the vehicle, compresses the air, and supplies the air to the cathode of the fuel cell 11 as the reactive gas.

The number of rotations of a motor (not shown) that drives the air supply unit 18 including the air compressor or the like is controlled by the output controller 17 provided with a PWM (pulse width modulation) type inverter using the PWM based on control instructions received from the fuel cell ECU 41 of the control unit 22.

Exhaust gas discharged from a hydrogen outlet 11a of the fuel cell 11 is introduced into a dilution box (not shown) via a discharge control valve (not shown) which is controlled so as to be opened/closed by the fuel cell ECU 41 of the ECU 22 and discharged to the outside (the atmosphere) via the purging valve 21 after the hydrogen concentration is reduced below a pre-determined concentration in the dilution box.

A part of the un-reacted exhaust gas discharged from the hydrogen outlet 11a of the fuel cell 11 is introduced into a circulation path provided with, for example, a circulation pump (not shown) and an ejector (not shown). Hydrogen supplied from the hydrogen tank 19a and the exhaust gas discharged from the fuel cell 11 are mixed and re-supplied to the fuel cell 11.

The un-reacted exhaust gas discharged from the air outlet 11b of the fuel cell 11 is discharged to the outside (the atmosphere) via the back-pressure regulating valve 20 of which the valve opening rate is controlled by the fuel cell ECU 41 of the control unit 22.

The DC-DC converter 12 includes, for example, a chopper type power conversion circuit. The DC-DC converter 12 controls the output current value retrieved from the fuel cell 11 by, for example, the chopping operation of the chopper type power conversion circuit, namely by switching on/off of a switching element provided at the chopper type power conversion circuit. The chopping operation is controlled according to the control pulse duty, or the on/off rate received from the control unit 22.

For example, if the control pulse duty received from the control unit 22 is set to 0% when the output current is inhibited from being retrieved from the fuel cell 11, the switching element of the chopper type power conversion circuit is locked in the off state and the fuel cell 11 and PDU 15 are electrically disconnected. On the other hand, when the control pulse duty is set to 100% and the switching element is locked in the on state, the fuel cell 11 and PDU 15 are in a so-called directly connected state and the output voltage of the fuel cell 11 and the input voltage of the PDU 15 become equal.

Further, when the control pulse duty is set to an appropriate value of between 0 and 100%, the DC-DC converter 12 appropriately controls the output current of the fuel cell 11, which is the primary current, according to the control pulse duty and outputs the controlled current as the secondary current.

The accumulator 13 is a capacitor or a battery including an electric double layer capacitor and an electrolytic capacitor, connected to the DC-DC converter 12 and PDU 15 in parallel.

With this structure, the fuel cell 11 and accumulator 13 constituting the fuel cell system serve as a power source for the motor 16.

The PDU 15 is provided with, for example, a PWM (pulse width modulation) type inverter and controls the driving and regeneration of the motor 16 according to control instructions outputted from the control unit 22. The PWM inverter is provided with, for example, a bridge circuit including multiple bridge-coupled transistor switching elements. For example, for driving the motor 16, the PWM inverter converts the direct current power supplied from the DC-DC converter 12 and accumulator 13 to three-phase alternate current power based on pulse wide modulation signals received from the motor ECU 42 of the control unit 22 and supplies it to the motor 16. On the other hand, for regenerating the motor 16, the PWM inverter converts the three-phase alternate current power supplied from the motor 16 to direct current power and supplies it to the accumulator 13 for charging.

The motor 16 is, for example, a permanent magnet type three-phase alternate current synchronous motor using a permanent magnet for the magnetic field. The motor 16 is driven and controlled by the three-phase alternate current power supplied from the PDU 15 and serves as a generator when the driving force is transmitted from driving wheels W to the motor 16 during vehicle deceleration, generating a so-called regenerative braking force and recovering the kinetic energy of the vehicle as electric energy.

The fuel cell ECU 41 of the control unit 22 outputs, for example, indicator values for the reactive gas flow rate supplied from the air supply unit 18 to the fuel cell 11 and indicator values for an opening rate of the back-pressure regulating valve 20 as power generation instructions based on vehicle running conditions, hydrogen concentration of the reactive gas supplied to the anode of the fuel cell 11, hydrogen concentration of the exhaust gas discharged from the anode of the fuel cell 11, power generation conditions of the fuel cell 11 such as voltages between the terminals of a plurality of fuel cells, output current retrieved from the fuel cell 11, and temperature TF inside the fuel cell 11 for controlling the power generation of the fuel cell 11.

The motor ECU 42 of the control unit 22 controls the power conversion of the PWM inverter provided to the PDU 15. For example, for driving the motor 16, the motor ECU 42 calculates the required driving power according to a torque order for torque supplied from the motor 16 based on detection signals of an accelerator opening rate AC regarding the rate at which the accelerator pedal is actuated by the driver and of the number of rotations NM of the motor 16, for example, with reference to the required driving power map shown in FIG. 2. Then, the motor ECU 42 sets a switching order (namely, pulse width modulation signals) including pulses switching on/off the switching elements of the PMW inverter by pulse width modulation (PWM) according to the required driving power.

Figure 2:
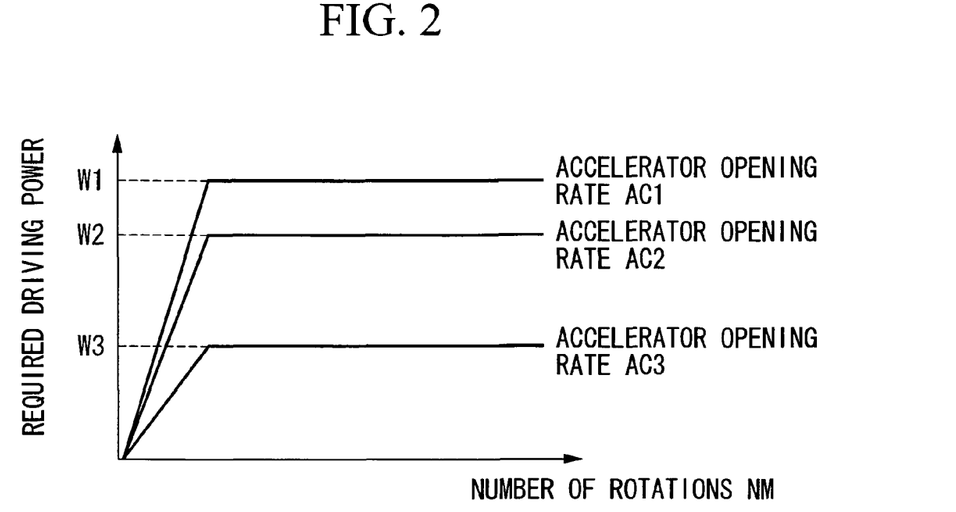
FIG. 2 is a diagram showing an example of correspondence between a number of rotations of the motor NM and required driving power for each appropriate accelerator opening rate AC.

For example, in the required driving power map shown in FIG. 2, the required driving power is increased up to a pre-determined required driving power upper limit for each appropriate accelerator opening rate AC (for example, AC1>AC 2>AC3) as the number of rotations NM of the motor 16 is increased. The pre-determined required driving power upper limit for each accelerator opening rate AC is set to change to an increasing tendency (for example W1>W2>W3) as the accelerator opening rate AC is increased.

When the PDU 15 receives the switching order from the motor ECU 42 of the control unit 22, the stator coils (not shown) of the respective phases of the motor 16 are sequentially commutated so that the magnitudes (namely amplitudes) and phases of the applied voltages of the U, V, and W phases are controlled and the U, V, and W phase currents according to the torque order are applied to the respective phases of the motor 16.

Therefore, the motor ECU 42 of the control unit 22 receives, for example, detection signals supplied from the system voltage sensor 32 detecting a system voltage VS that is an input voltage to the PDU 15, detection signals supplied from the motor tachometer 34 detecting the number of rotations NM of the motor 16, and detection signals supplied from the accelerator opening rate sensor 35 detecting the accelerator opening rate AC.

The management ECU 43 of the control unit 22 outputs control pulses for controlling the power conversion of the DC-DC converter 12 and controls the output current value retrieved from the fuel cell 11 based on the power generation instruction to the fuel cell 11.

The management ECU 43 of the control unit 22 predicts the reduction degree of the system voltage VS according to the operational state of the motor 16 (namely, a quantity of state of an amount of reduction of the system voltage VS including time changes and the like of the amount of reduction of the system voltage VS in addition to the amount of reduction of the system voltage itself), for example, based on the temperature TF of the fuel cell 11 and the number of rotations NM of the motor 16.

For example, when the number of rotations NM of the motor 16 is relatively low, torque which can be output is increased. If a vehicle runs on a road surface which has a relatively low frictional resistance due to rainfall, freezing or the like, the number of rotations NM of the motor 16 suddenly increases. As a result, the output of the motor 16 is highly subject to sudden increases. If the output of the motor 16 is actually subject to sudden increases and the power consumption of the motor 16 is increased, there is a possibility that the system voltage VS suddenly drops. Therefore, the management ECU 43 determines whether the variation amount of the output of the motor 16 increases or not. According to the determination results, a motor output restriction start voltage VA and a motor output restriction end voltage VB (here, VA>VB>pre-determined lower limit system voltage) which are the threshold values of the system voltage VS for triggering the start and end of the processing to restrict the output (i.e., the power consumption) of the motor 16 are set and supplied to the motor ECU 42.

The end of the processing to restrict the output of the motor 16 corresponding to the motor output restriction end voltage VB is, for example, a processing to set the output of the motor 16 to zero.

Therefore, the management ECU 43 of the control unit 22 receives, for example, detection signals supplied from the fuel cell thermometer 31 detecting the temperature TF of the fuel cell 11 and detection signals supplied from the motor tachometer 34 detecting the number of rotations NM of the motor 16.

Figure 3:
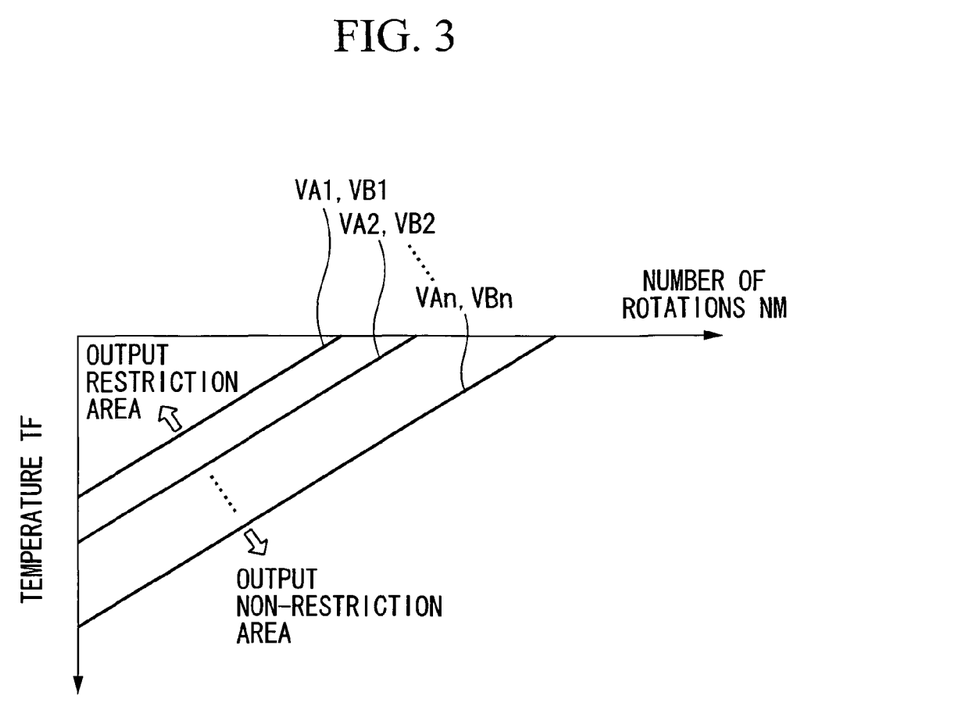
FIG. 3 is a diagram showing an example of a voltage map presenting a specific correspondence among a fuel cell temperature TF, a number of rotations NM of the motor, and motor output restriction start voltage VA and motor output restriction end voltage VB.

For example, as shown in FIG. 3, the management ECU 43 of the control unit 22 pre-stores a voltage map indicating a specific correspondence among the temperature TF of the fuel cell 11, the number of rotations NM of the motor 16, and the motor output restriction start voltage VA and the motor output restriction end voltage VB. In the voltage map, for example, on the two-dimensional coordinates defined by the temperature TF of the fuel cell 11 and the number of rotations NM of the motor 16, the area where the temperature TF or number of rotations NM is relatively low is set to an output restriction area where the output of the motor 16 is restricted. A plurality of motor output restriction start voltages VA1, . . . , VAn and motor output restriction end voltages VB1, . . . , VBn are set to establish an area where the temperature TF or number of rotations NM is relatively high as an output non-restriction area where the output restriction of the motor 16 is inhibited. The voltages VA1, . . . , VAn and VB1, . . . , VBn are changed to increasing tendency as the temperature TF of the fuel cell 11 drops, and changed to increasing tendency as the number of rotations NM of the motor 16 is lowered. Here, "n" is any natural number and, for example, VA1>VA2> . . . >VAn and VB1>VB2> . . . >VBn.

Then, after receiving the detection signals of the temperature TF of the fuel cell 11 and the number of rotations NM of the motor 16 from the fuel cell thermometer 31 and the motor tachometer 34 respectively, the management ECU 43 of the control unit 22 searches the voltage map for the voltages VA1, . . . VAn and VB1, . . . , VBn corresponding to the temperature TF and the number of rotations NM and supplies them to the motor ECU 42 as the motor output restriction start voltage VA and the motor output restriction end voltage VB which are the threshold values of the system voltage VS.

The management ECU 43 of the control unit 22 creates a voltage map by estimating the maximum value of the power variation amount of the motor 16 based on the number of rotations NM of the motor 16, estimating the maximum value of the amount of reduction of the system voltage VS according to the operational state of the motor 16 based on the temperature TF of the fuel cell 11, and setting the plurality of motor output restriction start voltages V1, . . . , VAn and motor output restriction end voltages VB1, . . . , VBn according to the prediction results.

In other words, the power which can be output from the fuel cell 11 is changed to decreasing tendency as the temperature TF of the fuel cell 11 drops, and the maximum variation amount of the output of the motor 16 is changed to increasing tendency as the number of rotations NM of the motor 16 is lowered. Therefore, for example, as in periods of time α1 and α2 shown in FIG. 4, in the case in which the temperature TF of the fuel cell 11 is relatively low and the number of rotations NM of the motor 16 is relatively low, the output of the motor 16 is predicted to be highly possible to increase suddenly. On the other hand, in the case in which the output of the motor 16 is actually increased, it is predicted that the system voltage VS may be highly decreased suddenly as the power consumption of the motor 16 is increased. In such a case, the processing to restrict the output of the motor 16 is made to be executed easily. Thereby, the motor output restriction start voltage VA and the motor output restriction end voltages VB are increased, thus the output of the motor 16 is restricted before the system voltage VS is excessively reduced.

Figure 4:
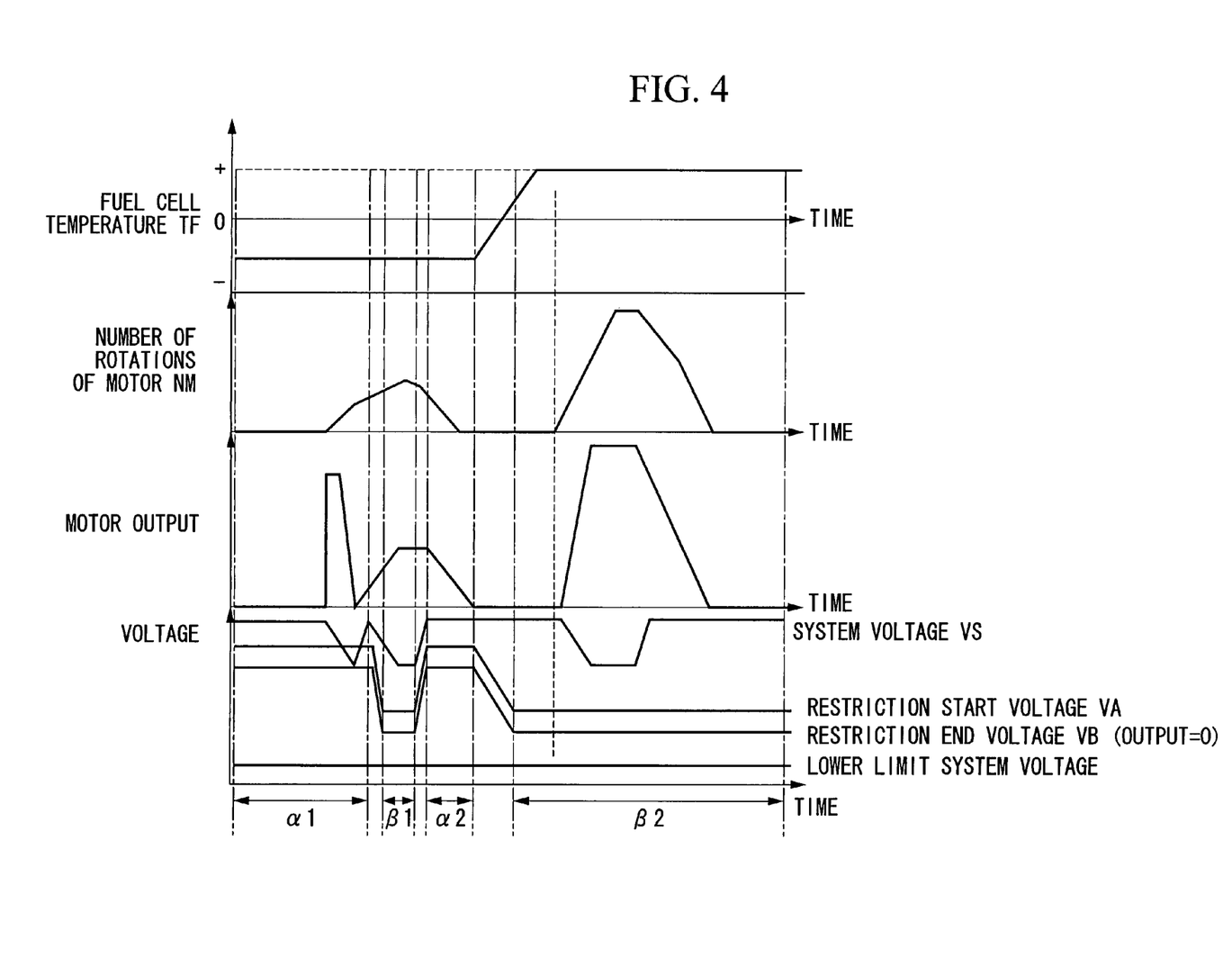
FIG. 4 is a diagram showing an example of time changes in the fuel cell temperature TF, number of rotations NM of the motor, motor output, system voltage VS, motor output restriction start voltage VA, and motor output restriction end voltage VB.

On the other hand, for example, as in the period of time β1 shown in FIG. 4, when the number of rotations NM of the motor 16 is relatively high although the temperature TF of the fuel cell 11 is relatively low, the sudden increase of the output of the motor 16 is predicted to be prevented. For example, as in the period of time β2 shown in FIG. 4, when the temperature TF of the fuel cell 11 is relatively high, it is predicted that the power consumption of the motor 16 is prevented from increasing above the output of the fuel cell 11 even if the output of the motor 16 is suddenly increased. In such cases, the processing to restrict the output of the motor 16 is difficult to execute, and the motor output restriction start voltage VA and motor output restriction end voltage VB are reduced.

The motor output restriction start voltage VA and the motor output restriction end voltage VB are inputted to the motor ECU 42 from the management ECU 43. According to a detected value of the system voltage VS received from the system voltage sensor 32, for example, as shown by the below equation (1), the motor ECU 42 sets an output restriction coefficient K (%), which is a restriction rate for restricting the output of the motor 16, to be changed toward increasing tendency (e.g., changing from 0% toward 100%) accompanied with the reduction of the system voltage VS from the motor output restriction start voltage VA toward the motor output restriction end voltage VB.

When the system voltage VS is smaller than the motor output restriction start voltage VA and larger than the motor output restriction end voltage VB, the output of the motor 16 is restricted according to the set output restriction coefficient K (0%<K<100%).

$$K = \frac{(VS - VB)}{(VA - VB)} \times 100 \qquad \text{[Equation 1]}$$

When the system voltage VS is not smaller than the motor output restriction start voltage VA, the output restriction coefficient K (%)=100% and the output restriction of the motor 16 is inhibited.

On the other hand, when the system voltage VS is not larger than the motor output restriction end voltage VB, the output restriction coefficient K (%)=0% and the output of the motor 16 is set to zero.

The control apparatus 10 for a fuel cell vehicle of the present embodiment has the above structure. An operation of the control apparatus 10 for a fuel cell vehicle, or the control method for a fuel cell vehicle, is described hereafter with reference to the drawings.

Figure 5:
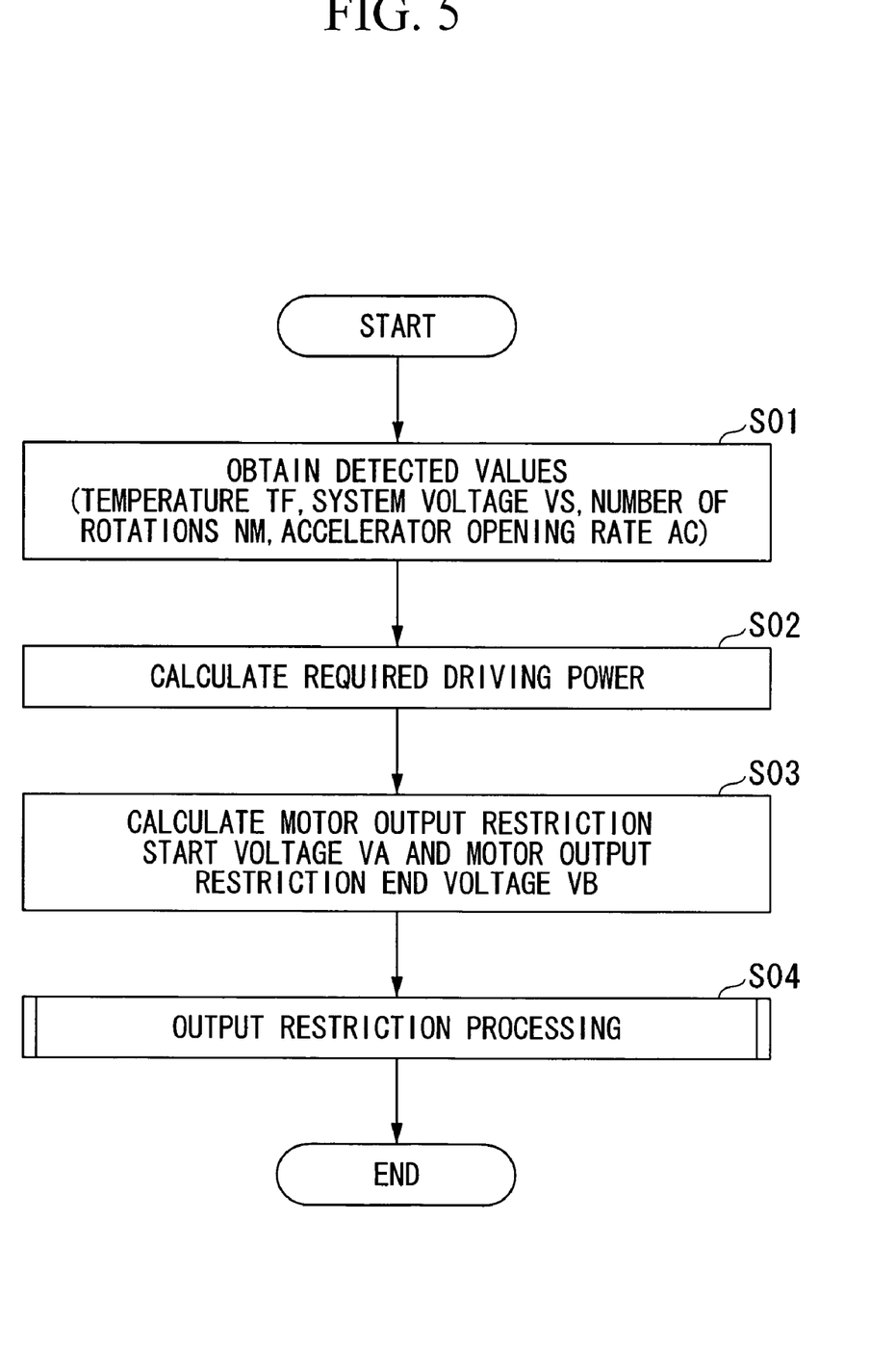
FIG. 5 is a flowchart showing an operation of the control apparatus for a fuel cell vehicle according to an embodiment of the invention.

First, for example in Step S01 shown in FIG. 5, detected values of the temperature TF of the fuel cell 11, the system voltage VS, the number of rotations NM of the motor 16, and the accelerator opening rate AC are obtained from the fuel cell thermometer 31, the system voltage sensor 32, the motor tachometer 34, and the accelerator opening rate sensor 35 as an input processing.

Then, in Step S02, the required driving power according to the torque order for torque supplied from the motor 16 is calculated based on the accelerator opening rate AC regarding the rate at which the accelerator pedal is actuated by the driver and the number of rotations NM of the motor 16, for example, with reference to the map shown in FIG. 2.

Then, in Step S03, the motor output restriction start voltage VA and the motor output restriction end voltage VB are calculated based on the temperature TF of the fuel cell 11 and the number of rotations NM of the motor 16, for example, with reference to the voltage map shown in FIG. 3.

Then, in Step S04, an output restriction processing to restrict the output of the motor 16 is executed based on the system voltage VS and the motor output restriction start voltage VA and the motor output restriction end voltage VB as described below and the series of processings ends.

The aforementioned output restriction processing of Step S04 is described hereafter.

Figure 6:
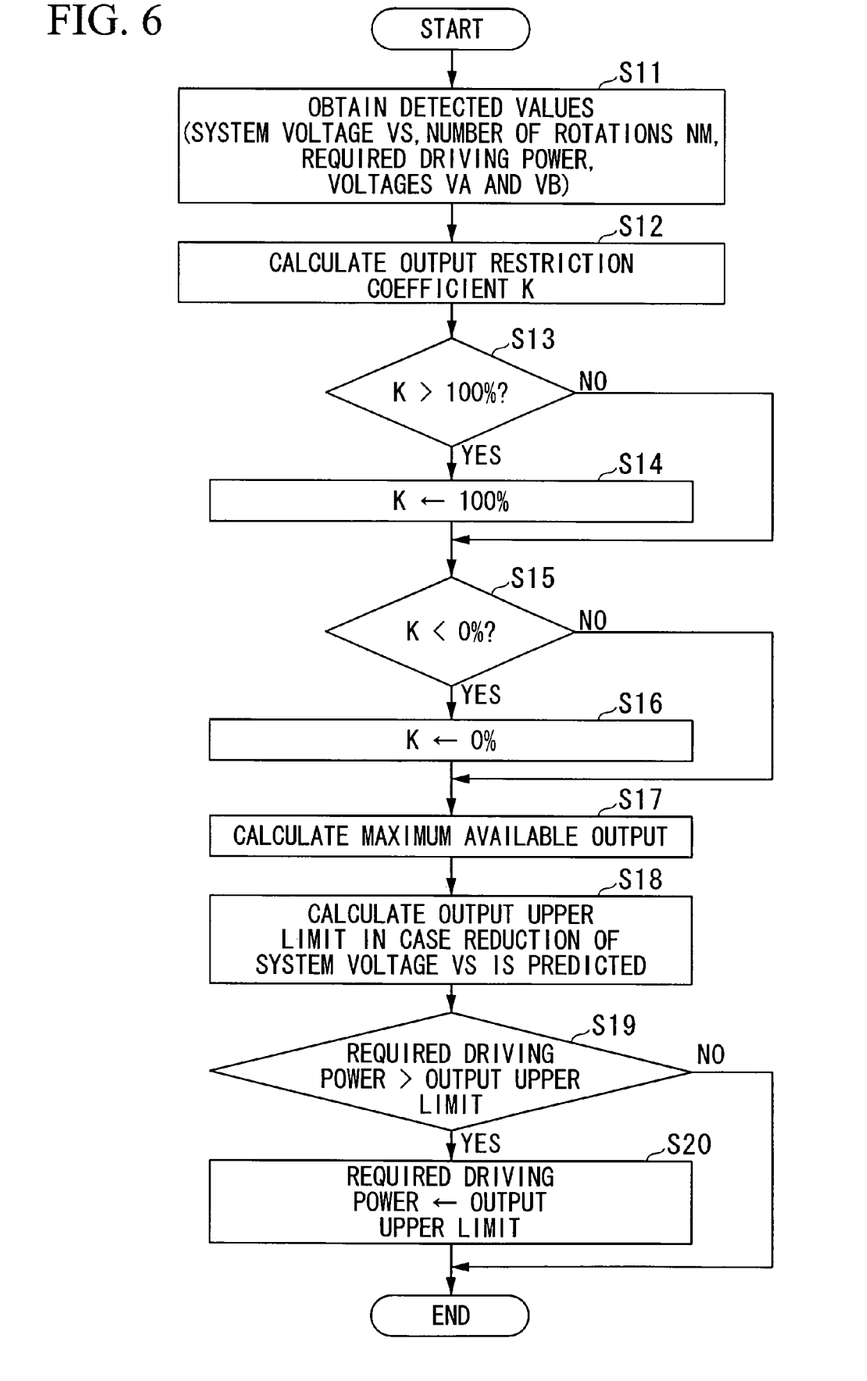
FIG. 6 is a flowchart showing an output restriction process of Step S04 shown in FIG. 5.

First, for example in Step S11 shown in FIG. 6, the system voltage VS, the number of rotations NM of the motor 16, the required driving power, and the motor output restriction start voltage VA and the motor output restriction end voltage VB are obtained by a parameter acquisition processing.

Then, in Step S12, the output restriction coefficient K is calculated by applying the system voltage VS and the motor output restriction start voltage VA and the motor output restriction end voltage VB, for example, to the above equation (1).

Then, in Step S13, a determination is made as to whether the output restriction coefficient K (%) is larger than 100%.

If the determination result is "NO," the process proceeds to Step S15, which will be explained later.

On the other hand, if the determination result is "YES," the process proceeds to Step S14. In Step S14, the output restriction coefficient K (%) is set to 100%, and the process proceeds to Step S15.

Then, in Step S15, a determination is made as to whether the output restriction coefficient K (%) is smaller than 0%.

If the determination result in Step S15 is "NO," the process proceeds to Step S17, described hereafter.

On the other hand, if the determination result in Step S15 is "YES," the process proceeds to Step S16. In Step S16, the output restriction coefficient K (%) is set to 0%, and the process proceeds to Step S17.

Figure 7:
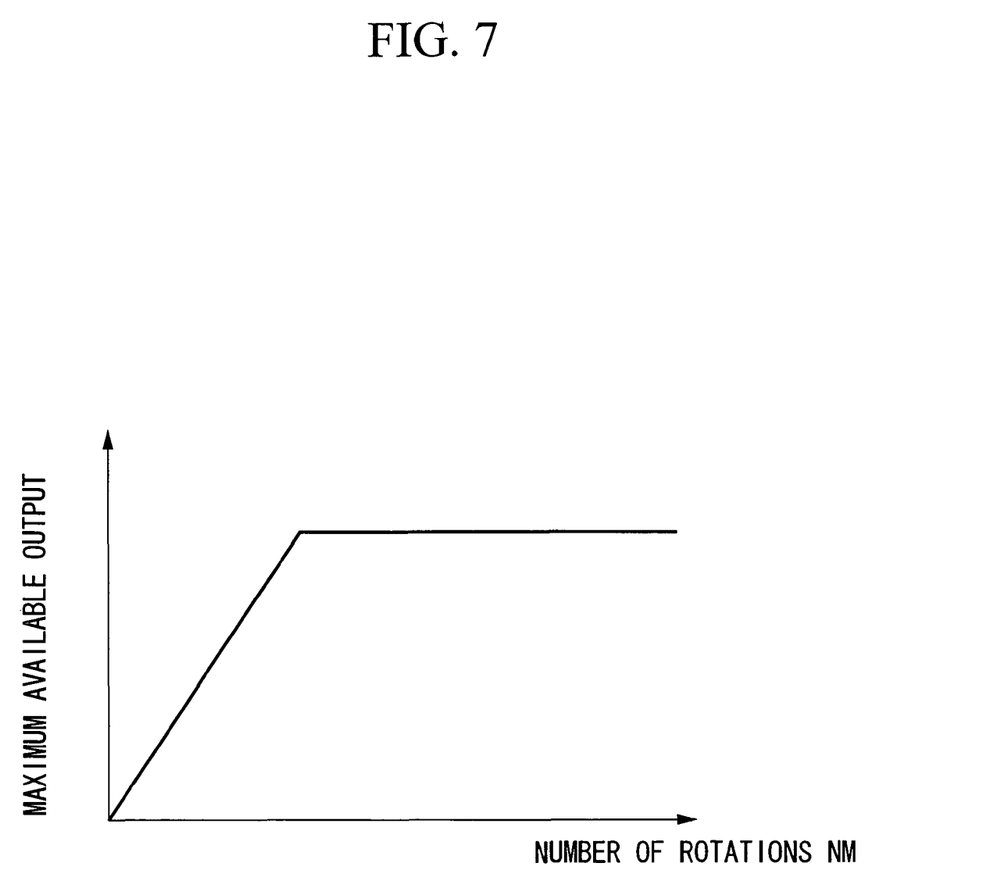
FIG. 7 is a diagram showing an example of correspondence between a number of rotations of the motor NM and a generatable maximum output.

In Step S17, the maximum output that the motor 16 can generate (a maximum available output) is calculated based on the number of rotations NM of the motor 16, for example, with reference to a pre-determined maximum available output table shown in FIG. 7. In the maximum available output table shown in FIG. 7, the pre-determined maximum available output is set to change to increasing tendency to an upper limit of the pre-determined maximum available output as the number of rotations NM of the motor 16.

In Step S18, a value obtained by multiplying the maximum available output of the motor 16 by the output restriction coefficient K (the maximum available output times the output restriction coefficient K) is set as the output upper limit of the output of the motor 16 in the case in which estimating the system voltage VS may drop according to the operational state of the motor 16.

Then, in Step S19, a determination is made as to whether the required driving power for the motor 16 is larger than the output upper restriction.

If the determination result is "NO," the series of processings ends.

On the other hand, if the determination result is "YES," the process proceeds to Step 20. In Step S20, the required driving power for the motor 16 is set to the output upper limit and the series of processings ends.

As described above, according to the control apparatus 10 for a fuel cell vehicle and the control method for a fuel cell vehicle of this embodiment, the system voltage VS of the fuel cell system is prevented from being excessively reduced even when the output of the motor 16 is suddenly increased. In addition, the output of the motor 16 is prevented from being excessively restricted in the situation where the system voltage VS is less likely to be subject to excessive reduction.

Further, according to the control apparatus 10 for a fuel cell vehicle of this embodiment, the reduction degree of the system voltage VS of the fuel cell system is predicted, the calculation processing of calculating the motor output restriction start voltage VA and the motor output restriction end voltage VB is executed by the management ECU 43, and the output restriction processing to restrict the output of the motor 16 according to the reduction degree of the system voltage VS is executed by the motor ECU 42. Therefore, in comparison with the case in which the calculation processing and the output restriction processing are executed at a single computation unit, or the case in which a series of complex processings of detecting the variation of the output of the motor 16, estimating the reduction degree of the system voltage based on the detection result, and restricting the output of the motor 16 according to the prediction result are executed at a single computation unit, the output restriction can be promptly executed. Thereby, the system voltage VS is prevented from being excessively reduced because of the delayed start of the output restriction processing of the motor 16.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In the above embodiment, the accumulator 13 is connected to the DC-DC converter 12 and PDU 15 in parallel. However, for example, the accumulator 13 can be connected to the DC-DC converter 12 and PDU 15 via a bidirectional DC-DC converter 14 in parallel as in the control apparatus 10 for a fuel cell vehicle shown in FIG. 8 according to a modified embodiment of the above embodiment.

Figure 8:
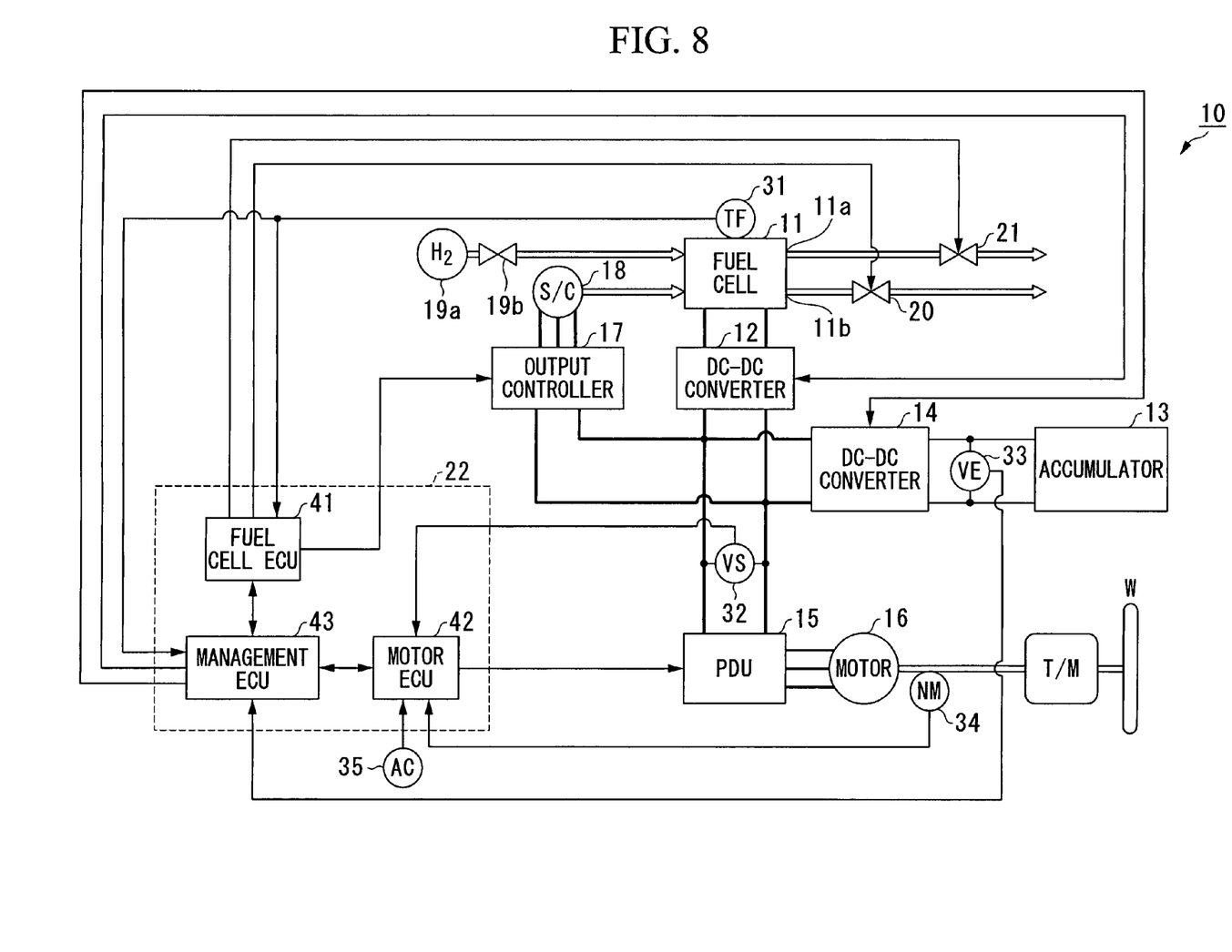
FIG. 8 is a drawing showing a construction of a control apparatus of a fuel cell vehicle according to a modified embodiment of the present invention.

In the modified embodiment, the DC-DC converter 14 lowers the system voltage VS regarding the power generation of the fuel cell 11 or the regeneration of the motor 16, and can charge the accumulator 13 and can boost the terminal voltage VE of the accumulator 13. Detection signals supplied from a terminal voltage sensor 33 detecting the terminal voltage VE of the accumulator 13 are inputted to the management ECU 43 of the control unit 22.

Figure 9:
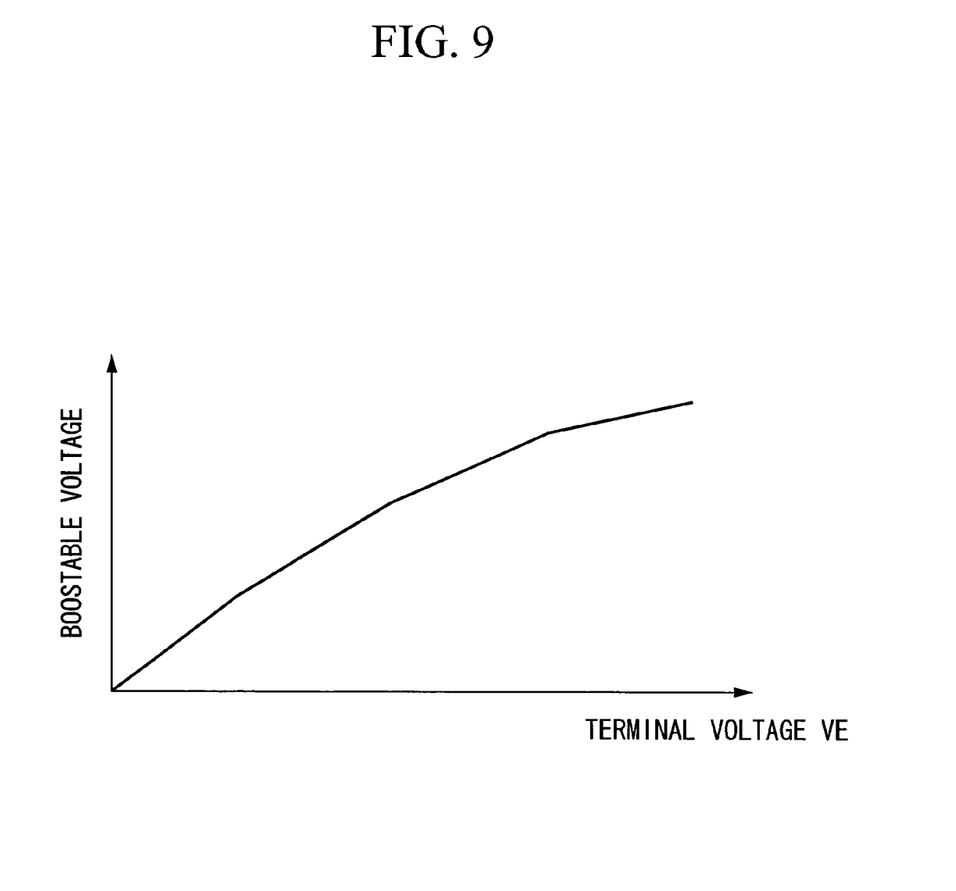
FIG. 9 is a diagram showing an example of correspondence between a terminal voltage VE of an accumulator and a boostable voltage by boosting of a DC-DC converter.

In this modified embodiment, the management ECU 43 of the control unit 22 calculates an achievable voltage by boost operation of the DC-DC converter 14 (the boostable voltage) based on the terminal voltage VE of the accumulator 13, for example, with reference to the boostable voltage table shown in FIG. 9. The management ECU 43 predicts the maximum value of the reduction degree of the system voltage VS according to the operational state of the motor 16 based on the boostable voltage, sets the motor output restriction start voltage VA and the motor output restriction end voltage VB according to the prediction result, and supplies them to the motor ECU 42. Alternatively, based on the boostable voltage, a determination is made as to whether the boostable voltage is higher than the motor output restriction start voltage VA, and the determination results are supplied to the motor ECU 42. In the boostable voltage table shown in FIG. 9, the boostable voltage which is changed to increasing tendency is set as the increase of the terminal voltage VE of the accumulator 13.

In addition to the motor output restriction start voltage VA and the motor output restriction end voltage VB, the determination results as to whether or not the boostable voltage by the DC-DC converter 14 is higher than the motor output restriction start voltage VA is inputted to the motor ECU 42. The motor ECU 42 executes the output restriction processing described above when the boostable voltage is not higher than the motor output restriction start voltage VA.

The operation of the control apparatus 10 for a fuel cell vehicle, i.e., the control method for a fuel cell vehicle, according to the modified embodiment is described hereafter with reference to the drawings.

Figure 10:
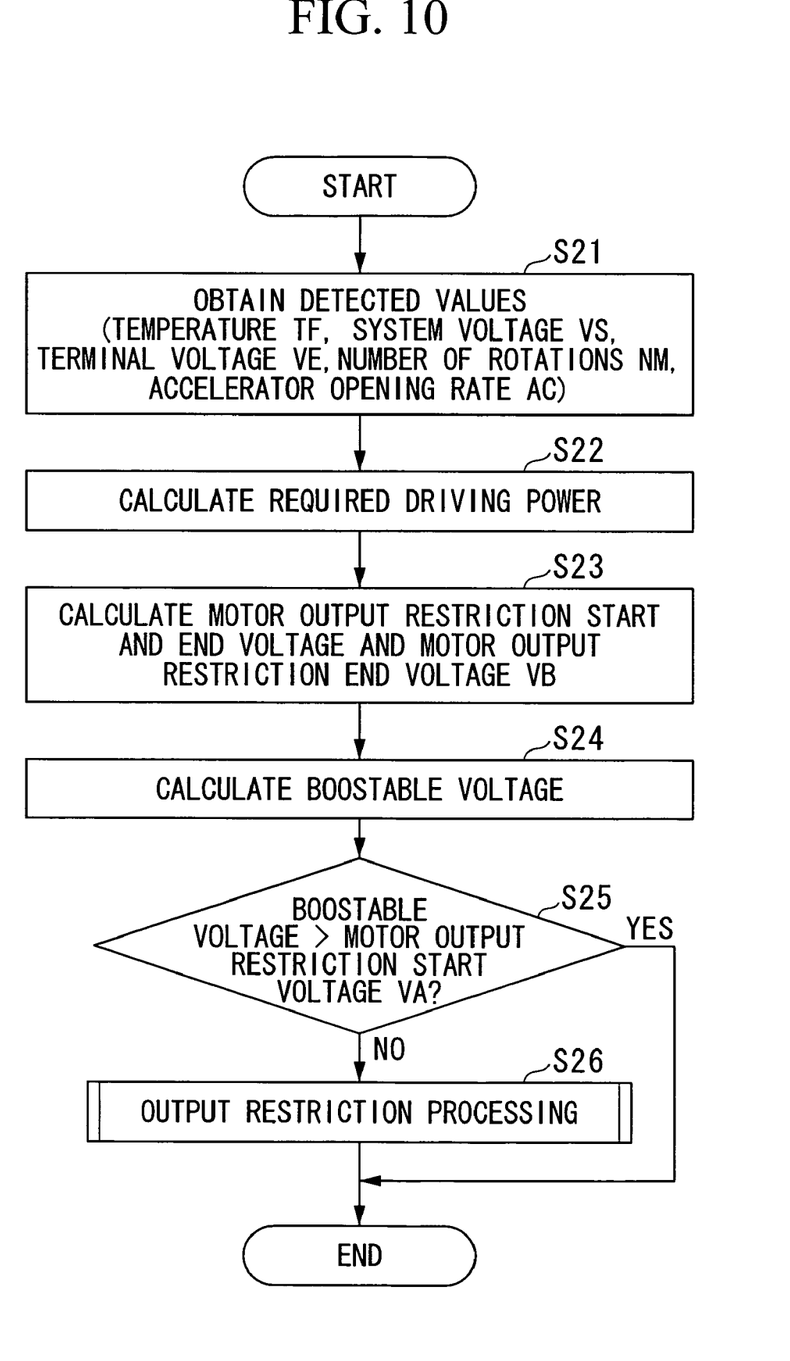
FIG. 10 is a flowchart showing an operation of a control apparatus of a fuel cell vehicle according to a modified embodiment of the present invention.

First, for example in Step S21 shown in FIG. 10, detected values of the temperature TF of the fuel cell 11, the system voltage VS, the terminal voltage VE, the number of rotations NM of the motor 16, and the accelerator opening rate AC are obtained from the fuel cell thermometer 31, the system voltage sensor 32, the terminal voltage sensor 33, the motor tachometer 34, and the accelerator opening rate sensor 35 by an input processing.

In Step S22, a processing equivalent to that of Step S02 described above is executed.

Then, in Step S23, a processing equivalent to that of Step S03 described above is executed.

Then, in Step S24, the boostable voltage of the DC-DC converter 14 is calculated based on the terminal voltage VE of the accumulator 13, for example, with reference to the boostable voltage table shown in FIG. 9.

Then, in Step S25, a determination is made as to whether the boostable voltage is higher than the motor output restriction start voltage VA.

If the determination result is "YES", even if, for example, the output of the motor 16 is suddenly increased, the series of processings ends by assuming that the system voltage VS is prevented from being excessively reduced as a result of the boosting voltage of the DC-DC converter 14.

On the other hand, if the determination result is "NO", the process proceeds to Step S26.

Then, in Step S26, a processing equivalent to that of Step S04 described above is executed and the series of processings ends.

According to the control apparatus 10 for a fuel cell vehicle and the control method for a fuel cell vehicle according to the modified embodiment, it is possible to prevent the output of the motor 16 from being excessively restricted by determining whether or not the output restriction processing of the motor 16 is necessarily based on the boostable voltage by boost operation of the DC-DC converter 14.

In the described embodiment, for example as shown in FIG. 5, the processing in Step S03 for calculating the motor output restriction start voltage VA and the motor output restriction end voltage VB and the processing of the output restriction to restrict the output of the motor 16 in Step S04 are a series of processings. However, for example, the processings of Steps S03 and S04 can be executed independently at appropriate times.

In such a case, the maximum variation amount of the output of the motor 16 based on the number of rotations NM of the motor 16 is predicted and, then, the maximum reduction degree of the system voltage VS according to the operational state of the motor 16 based on the temperature TF of the fuel cell 11 is predicted. The prediction processing to set the motor output restriction start voltage VA and the motor output restriction end voltage VB according to the prediction results and the output restriction process to restrict the output of the motor 16 based on the motor output restriction start voltage VA and the motor output restriction end voltage VB are executed independently. Thereby, the execution of the output restriction processing is prevented from being delayed even if, for example, relatively complex computations are required to improve the accuracy of prediction in the prediction processing. In other words, the motor output restriction start voltage VA and the motor output restriction end voltage VB which are set in the prediction processing and which are executed at an appropriate time are stored in an appropriate memory unit. When the detection result of the operational state of the motor 16 is obtained, the output restriction of the motor 16 is immediately executed with reference to the motor output restriction start voltage VA and the motor output restriction end voltage VB which are stored in the memory unit. Therefore, the system voltage VS of the fuel cell system is prevented from being excessively reduced even if the output of the motor 16 is suddenly increased.

In the above described embodiment, the motor output restriction start voltage VA and the motor output restriction end voltage VB are calculated based on the temperature TF of the fuel cell 11 and the number of rotations NM of the motor 16, for example, with reference to the voltage map shown in FIG. 3 in Steps S03 and S23. However, for example, when detected values of the temperature TF of the fuel cell 11 and the number of rotations NM of the motor 16 are obtained, the maximum variation amount of the output of the motor 16 based on the number of rotations NM of the motor 16 can be predicted, the maximum reduction degree of the system voltage VS according to the operational state of the motor 16 based on the temperature TF of the fuel cell 11 can be predicted, and the motor output restriction start voltage VA and the motor output restriction end voltage VB can be set according to these prediction results.

What is claimed is:

1. A control apparatus for a fuel cell vehicle comprising:
a motor which drives a vehicle;
a motor control device which controls driving and regenerative operations of the motor;
a fuel cell which serves as a fuel cell system constituting a power source for the motor, which generates power by an electrochemical reaction using reaction gas supplied from a reaction gas supply device;
an accumulator which is charged by a power generation of the fuel cell and a regenerative power from the motor;
an output control device which controls an output of the fuel cell;
a voltage reduction degree prediction device suitably programmed with instructions which, when executed by the voltage reduction degree prediction device, cause the voltage reduction degree prediction device to predict a reduction degree of system voltage according to an operational state of the motor;
a motor output restriction device suitably programmed with instructions which, when executed by the motor output restriction device, cause the motor output restriction device to restrict a motor output according to the reduction degree of the system voltage predicted by the voltage reduction degree prediction device; and
a tachometer which detects a number of rotations of the motor, wherein the voltage reduction degree prediction device is programmed with instructions which, when executed by the voltage reduction degree prediction device, cause the voltage reduction degree prediction device to predict a maximum value of an amount of change in a motor output based on the number of rotations detected by the tachometer.

2. A control apparatus for a fuel cell vehicle according to claim 1, further comprising a thermometer which detects a temperature of the fuel cell, wherein
the voltage reduction degree prediction device predicts a maximum value of an amount of reduction of the system voltage according to an operational state of the motor based on the temperature detected by the thermometer.

3. A control apparatus for a fuel cell vehicle according to claim 1, further comprising:
a tachometer which detects a number of rotations of the motor; and
a thermometer which detects a temperature of the fuel cell, wherein
the voltage reduction degree prediction device predicts that an amount of reduction of the system voltage changes at an increasing tendency according to an operational state of the motor, in conjunction with a reduction of the temperature detected by the thermometer and the reduction of the number of rotations detected by the tachometer.

4. A control apparatus for a fuel cell vehicle according to claim 1, wherein the motor output restriction device restricts the motor output in the case in which the system voltage is less than a first threshold value, and causes the first threshold value to change at an increasing tendency in conjunction with an increase of the reduction degree of the system voltage predicted by the voltage reduction degree prediction device.

5. A control apparatus for a fuel cell vehicle according to claim 4, wherein the motor output restriction device sets a second threshold value that is smaller than the first threshold value, and in the case in which the system voltage is less than the first threshold value and greater than the second threshold value, sets a restriction rate according to the system voltage when restricting the motor output.

6. A control apparatus for a fuel cell vehicle according to claim 1 further comprising:
a first computation unit having the voltage reduction degree prediction device; and
a second computation unit having the motor output restriction device.

7. A control apparatus for a fuel cell vehicle according to claim 1 further comprising a power conversion device which boosts a terminal voltage of the accumulator, wherein
the voltage reduction degree prediction device predicts an amount of reduction of the system voltage according to an operational state of the motor based on an operational state of a voltage boosting operation by the power conversion device.

8. A control method for a fuel cell vehicle, the control method comprising:
restricting an output of a motor using the apparatus of claim 1.

9. A control method for a fuel cell vehicle according to claim 8, wherein a maximum value of an amount of reduction of the system voltage is predicted according to the operational state of the motor based on the temperature of the fuel cell.

10. A control method for a fuel cell vehicle according to claim 8, wherein the amount of reduction of the system voltage is predicted so as to change at an increasing tendency according to the operational state of the motor, in conjunction with the temperature reduction of the fuel cell and the number of rotation reductions of the motor.

11. A control method for a fuel cell vehicle according to claim 8, further comprising:
restricting the motor output in the case in which the system voltage is less than a first threshold value; and
changing the first threshold value at an increasing tendency in conjunction with the increase in the reduction degree.

12. A control method for a fuel cell vehicle according to claim 11,
wherein a second threshold value that is smaller than the first threshold value is set, and
the control method further comprises the step of a restriction rate when restricting the motor output according to the system voltage in the case in which the system voltage is less than the first threshold value and greater than the second threshold value.

13. A control method for a fuel cell vehicle according to claim 8, further comprising the steps of:
estimating the reduction degree of the system voltage of the fuel cell system according to the operational state of the motor; and
restricting the motor output according to the reduction degree, wherein
the estimating step and restricting step are executed with mutually independent timing.

14. A control method for a fuel cell vehicle according to claim 8, wherein the reduction degree of the system voltage is predicted according to the operational state of the motor, based on an operational state of a voltage boosting operation by a power conversion device which boosts the terminal voltage of the accumulator.

* * * * *